Feb. 20, 1923.

E. A. SPERRY.
GYROSCOPIC APPARATUS FOR TORPEDOES.
FILED AUG. 26, 1915.

1,446,276.

3 SHEETS—SHEET 1.

INVENTOR.
ELMER A. SPERRY
BY Herbert H. Thompson
ATTORNEY.

Feb. 20, 1923.

E. A. SPERRY,
GYROSCOPIC APPARATUS FOR TORPEDOES,
FILED AUG. 26, 1915.

1,446,276.

3 SHEETS—SHEET 2.

INVENTOR.
ELMER A. SPERRY
BY Herbert H. Thompson
ATTORNEY.

Feb. 20, 1923.

E. A. SPERRY.
GYROSCOPIC APPARATUS FOR TORPEDOES.
FILED AUG. 26, 1915.

1,446,276.

3 SHEETS—SHEET 3.

INVENTOR.
ELMER A. SPERRY
BY Herbert H. Thompson
ATTORNEY.

Patented Feb. 20, 1923.

1,446,276

UNITED STATES PATENT OFFICE.

ELMER A. SPERRY, OF BROOKLYN, NEW YORK, ASSIGNOR TO SPERRY GYROSCOPE CO., OF BROOKLYN, NEW YORK, A CORPORATION OF NEW YORK.

GYROSCOPIC APPARATUS FOR TORPEDOES.

Application filed August 26, 1915. Serial No. 47,550.

*To all whom it may concern:*

Be it known that I, ELMER A. SPERRY, citizen of the United States of America, residing at 100 Marlborough Road, Brooklyn, New York, have invented certain new and useful Improvements in Gyroscopic Apparatus for Torpedoes, of which the following is a specification.

This invention relates to the gyroscopic steering gear of torpedoes of all types including both aerial and under water torpedoes. While the existing type of gyroscope employed in this connection has proved satisfactory for short ranges, serious faults have developed in the modern long range torpedo. It is the object of the present invention to overcome these defects and to produce a gyroscopic apparatus which will be dependable under all conditions.

In such apparatus, as at present constructed, a single gyroscope is employed which is spun to a high speed before the torpedo is launched. After launching, the driving force is withdrawn, so that during the entire run, the gyroscope spins alone by its own momentum, with the result that its speed constantly diminishes. This diminution in the number of revolutions results not only in the loss of directive power of the gyroscope, but actually causes deviation, and an increase in any small precessional movements that may have been set up. Another error that occurs with the present type of gyroscope on torpedoes has long puzzled workers in the art. The error seems to be due to the rotation and curvature of the earth, the latter factor being due to the high speed of the torpedo. The former error alone amounts to as much as a degree every four minutes. By departing entirely from the existing types of torpedo gyros, I have been able to construct an apparatus which eliminates all of the above mentioned defects by its fundamental principles of design.

Figure 1:
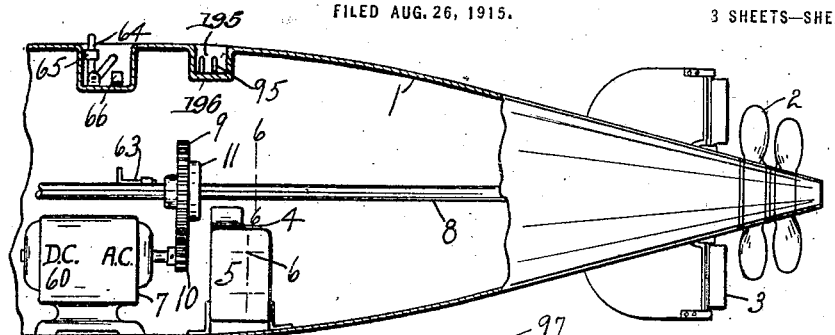
Figure 2:
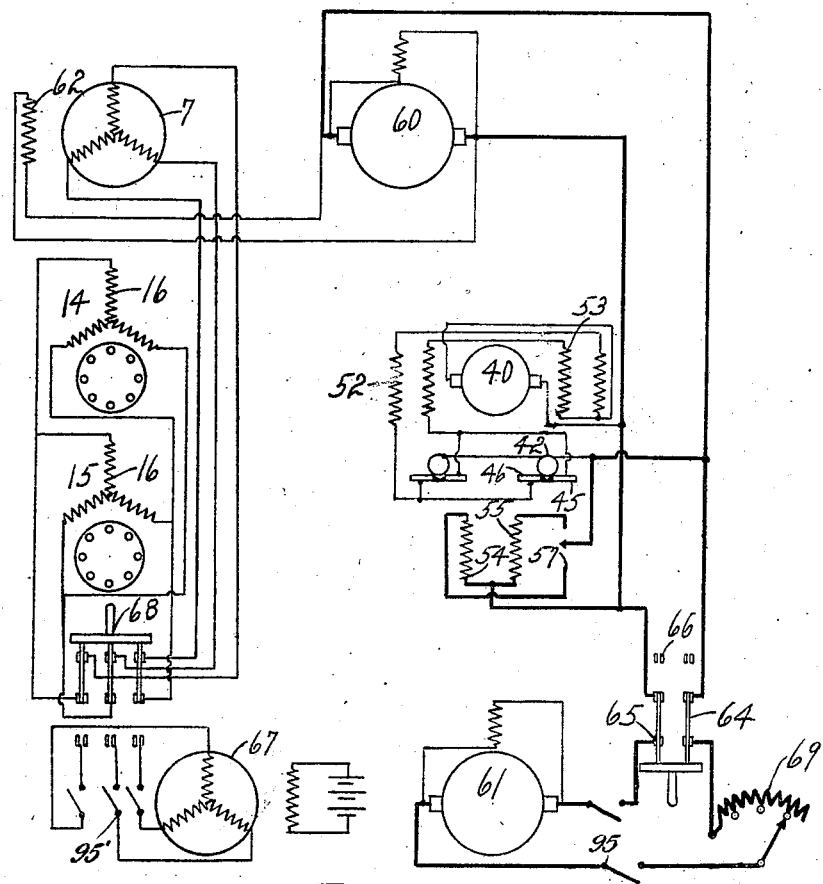
Figure 3:
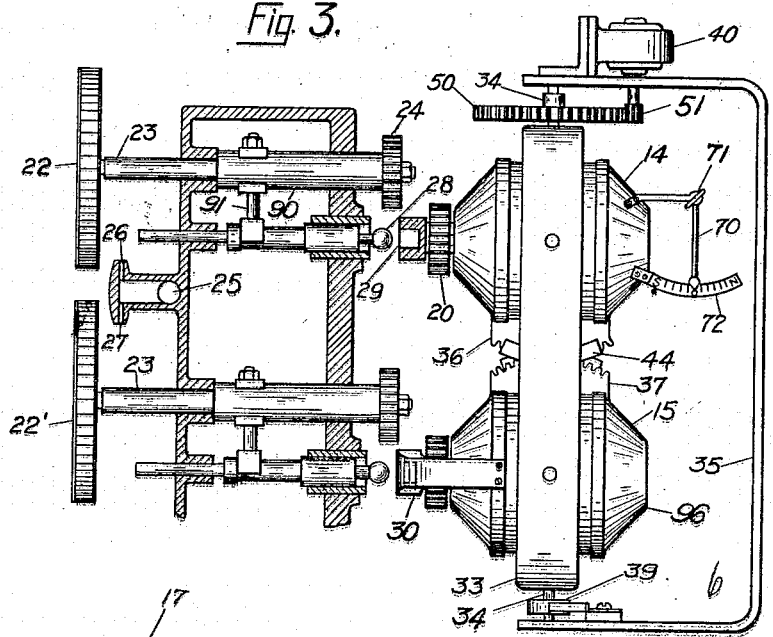
Figure 5:
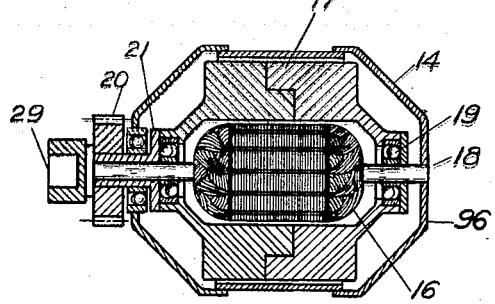
Figure 6:
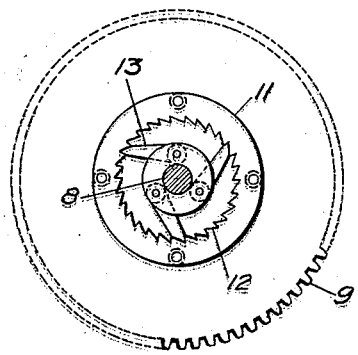
Figure 4:
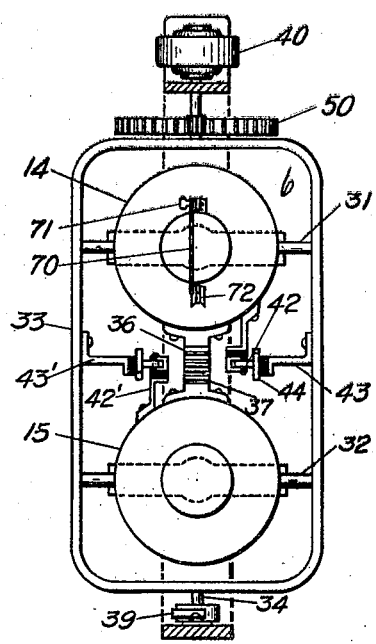
Figure 7:
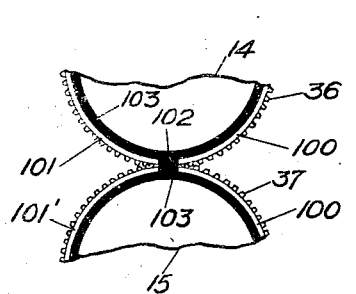
Figure 8:
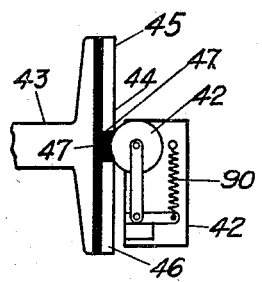

Referring to the drawings in which what I now consider to be the preferred forms of invention are illustrated, Fig. 1 is a vertical section of the rearward portion of a torpedo, showing my improved mechanism installed therein. Fig. 2 is a wiring diagram of my invention. Fig. 3 is a side elevation, partly in section, of my preferred form of gyroscopic unit. Fig. 4 is a rear elevation of the same. Fig. 5 is a section of one of the gyroscopes. Fig. 6 is an enlarged section on line 6—6 of Fig. 1. Fig. 7 is a detail showing a modified form of contacts for the gyroscopic unit. Fig. 8 is a detail of one of the trolley contacts.

In Fig. 1, 1 is the hull, 2 the propellers and 3 the rudders of a torpedo. Only so much of the interior mechanism is shown as is necessary to explain the invention. The usual steering engine is represented at 4, while 5 is the casing for the gyroscopic apparatus 6. For driving the gyroscope or gyroscopes, I employ an electric generator 7 driven preferably from the torpedo driving engine or turbine, as by being geared to the propeller shaft 8 through gear 9 and pinion 10. Preferably the connections between the generator and said shaft are such that the generator is driven from said shaft, but is free to run independently of said shaft, when supplied with an auxiliary driving means. Such connection may be termed a one way connection and is preferably constructed by equipping the hub 11 of gear 9 with an internal ratchet 12 with which pawls 13 mounted on shaft 8 are adapted to engage.

My gyroscopic unit comprises two or more oppositely driven gyroscopes 14 and 15. An electric motor, preferably of the A. C. induction type, is associated with each gyro, being built in as a part of the gyroscope itself. The casings 96 may or may not be exhausted, as desired.

By employing this type of motor for each gyro and driving all motors from the same generator, I am enabled to secure equal speeds for the gyros, a condition which is highly important for their successful operation.

In Fig. 5, the stator 16, on which all the windings are placed, is mounted within the rotor 17, thereby securing the maximum moment of inertia for the gyro. The rotor is journaled on the stator shaft 18, as by ball bearings 19. A gear 20 may be provided on an extension 21 from each rotor so that the gyros may be initially spun by the usual form spinning mechanism, if desired. Such mechanism is represented diagrammatically, only, as it forms no part of the present invention. A turbine wheel 22, 22' may be used for each gyro, being mounted on the same shafts 23 as gears 24, which are adapted to be brought into mesh with pinions 20, when the mechanism is operating. Compressed air from the torpedo reservoir is supplied to the wheels through conduit 25 and tangential nozzles 26, 27. Bolts 28, which enter sockets 29 in members 30 secured to the gyro casings 96, hold the gyros in a fixed position, while being driven in this manner. A timing mechanism (not shown) is provided, which after a given number of revolutions (sufficient to spin the gyroscope to the required speed) brings about a sudden displacement of the sleeve 90 which carries the turbine shaft, whereby the turbine 22 and pinion 24 are displaced from their initial positions to the positions shown in Fig. 3; a projection 91 from the sleeve engages the bolt 28 and withdraws this by the same movement. It results that the fly wheel is no longer driven and the gyroscope is unlocked and set free.

Both gyros are mounted in horizontal trunnions 31 and 32 in a common frame 33 which is journaled on vertical pivots 34 in a fixed portion 35 of the torpedo. Slip rings and brushes 39 may be used at these points to bring in the current to the gyros. Frame 33 is provided with a gear 50 designed to mesh with a pinion 51 on the shaft of a reversible rotor 40. Suitable contacts 42, 44 and 45, hereinafter described, control the motor by being connected to the opposed field windings 52 and 53 of the motor. I find direct current to be preferable for driving this motor, as well as the electrically controlled steering mechanism (not shown in detail) for the torpedo, which is represented in the wiring diagram by solenoids 54, 55 and switch 57. The two casings 14 and 15 are connected for equal and opposite precession about their horizontal axes as by means of gear sectors 36, 37. By this simple construction I am enabled to overcome the chief difficulty connected with this type of gyro-apparatus, namely, the error arising from the earth's rotation, since any tendency for the axis of one gyro to rise is opposed by the equal and opposite tendency of the other gyro. I also employ novel means to overcome the errors due to friction about the vertical axis of the support, thereby preventing the gyros from wandering. This comprises a contact device which is closed as soon as either gyro precesses beyond a predetermined point, and which operates the motor 40, referred to above. This device may be located upon one of the gyros 14 or 15 and upon a bracket 43 fixed to frame 33. It is shown as comprising a trolley 42 pivotally mounted on a base 42' secured to gyro 14, and a curved contact strip 44 on bracket 43. Said strip is composed of two conducting sections 45 and 46 (Fig. 2) separated by a dead section 47. The trolley normally rests on the dead section, but a precession of the gyro in either direction will cause a circuit to be completed through motor 40 as shown in Fig. 2. This will exert a torque about the vertical axis causing the gyro to precess back to its central position. It should be noted that the contact is so located that it is closed only by precession of the gyros and cannot be closed by inclination of the whole frame 33. The contact device is preferably duplicated on the gyro 15, as shown, whereby a more perfect balance and greater reliability are secured and the error due to backlash of the gear teeth overcome. The insulated section 47 is preferably provided with a depressed portion 47' so that when the trolley runs on said section, it will exert a centralizing effect on the gyros, due to the tension of the trolley spring 90.

In all gyroscopic apparatus which is designed to maintain a level on the surface of the earth, it has been found desirable to provide the apparatus with an eccentric weight designed to cause precession about the vertical axis of the instrument at exactly the required rate to keep the instrument in a given position. This rate of precession varies from 360° in 24 hours in a clockwise direction at the north pole through zero at the equator to 360° in 24 hours in a counter-clockwise direction at the south pole. To take care of these varying conditions, I have devised the adjustable weight 70, supported from the clamp-pivot 71, and balanced when in its vertical position by the weight of gear 20. Hence this position is the correct one for the equator. In north latitude, the bob 70 is swung out and adjusted so that it points to the corresponding graduation on the circular scale 72, while in south latitude it is swung in. My device possesses the further advantage that the scale need not be graduated with a special scale, but is simply laid out in degrees. This feature is due to the fact that the moment of the weight required is proportional to the cosine of the latitude, while my device secures this result by providing a circular means of adjustment which while it is moved through an equal arc for each degree of change in latitude, the moment applied is proportional to the cosine of the angle it makes with its normal position.

As above noted, while alternating current is preferred for driving the gyros, direct current is better adapted for the auxiliary control mechanism and for motor 40. A good example of such mechanism 54, 55, 57 is shown in the patent to Leavitt #839,161, December 25, 1906, according to which batteries are used to furnish the current. I prefer, however, to provide a direct current generator 60 for this purpose, which may be made within the same frame as dynamo 7, and is driven from the same source of power. Generator 60 may also be used to excite the field 62 of dynamo 7.

For spinning the gyros prior to or during the launching the air driven mechanism above described may be employed, but, when the ship on which the torpedo is stored is provided with suitable sources of electric current, other methods may be found preferable. Thus where the ship is equipped with a D. C. generator 61 of proper voltage, the generator 60 may be connected thereto and run as a motor, thereby driving dynamo 7 and supply current to the gyros. When being so driven, the pawl and ratchet connection, 12, 13 above described, allows the generator 7 to rotate independently of shaft 8. If, however, it is desired to drive shaft 8 with its attached parts, also, so as to bring it up to speed before the main driving motor is started, a sliding key 63 may be provided to lock gear 9 to shaft 8.

An automatic double-throw switch 64 may be provided to break at 65 the current of generator 61 with the dynamo-electric machine 60 as the torpedo is launched and to close at 66 the external circuit of machine 60 so that it will operate as a generator to drive motor 40 and the control solenoids 54, 55. Current may be introduced into the torpedo through socket 95. To form this socket an opening 195 is made in the wall of the torpedo, so that the contact finger or sockets do not project beyond the shell 1. The opening is of course closed at its base 196, to prevent water getting into the torpedo. The complementary portion 97 of the switch is designed to be automatically jerked out as the torpedo is launched, but after switch 64 it thrown. Contactor 97 and the catch against which switch 64 strikes are of course preferably supported by the torpedo tube. Such parts are not illustrated but, like mechanism is well known in this art, as shown for instance in the patent to Shonnard 1,035,647—Method of fire control for torpedoes.

The linkage which operates the said catch and withdraws the plug 97 may be operated from the means employed to release the torpedo in the tube, if desired, the plug being withdrawn in a similar fashion as usually employed to withdraw the locking bolt.

On the other hand, if the ship is equipped with an A. C. generator 67 of the proper characteristics, the gyros may be initially spun up by connecting them directly to generator 67, as by means of switch 68, which may also be of the automatic type.

It should be understood that some form of locking means such as bolts 28 and sockets 29 should be used, even when air starting is not employed, since it is important that the gyros be given a predetermined initial position and that they be held fixed while accelerating.

In all of the forms of starting devices, the apparatus should be so designed that the generator 7, after launching, will drive the gyros with at least as great speed as the initial speed of rotation; that is, there should be no diminution in speed of the gyros. I find it preferable, however, to design the generators so that the gyros are accelerated thereby beyond their initial speed of rotation. By this arrangement precessional oscillations are quickly suppressed and any slight angle of elevation that the gyro axis may have assumed in launching is eliminated. When a D. C. generator 61 on the ship is used to start the gyros, the speed may be properly adjusted by a rheostat 69.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use. Thus Fig. 7 shows a modified form of contact device for operating the motor 40 on the gyros. According to this modification, I mount contact strips 100, 101, 100′ and 101′ directly on a portion of each rotor casing, preferably on the gear sectors 36 and 37, the strips being separated as before by insulating pieces 102 and 103. These strips are placed on the pitch circle of the gear teeth, being arranged to roll upon each other as indicated, and are insulated from the gears by insulation 103. This arrangement does away with the use of any extra parts such as brackets 43 and 43′ on the frame 35.

Having described my invention, what I claim and desire to secure by Letters Patent is:

1. The combination with an automobile torpedo, of a gyroscope, an electric motor associated with the gyroscope, a dynamo driven from the torpedo driving engine, means independent of said torpedo engine for starting said gyroscope prior to the launching, and means for throwing out said last named means and for causing said dynamo to drive said motor, when launching the torpedo.

2. The combination with an automobile torpedo, of a gyroscope, an electric motor associated with the gyroscope, a dynamo driven from the torpedo driving engine, and means whereby said motor may be driven from an external source of supply prior to launching.

3. The combination with an automobile torpedo, of a gyroscope, an A. C. motor associated with the gyroscope, electrical means for controlling the torpedo from said gyroscope, and an A. C.-D. C. generator driven from the torpedo driving engine for actuating said motor and said means.

4. The combination with an automobile torpedo, of a gyroscope, an electric motor associated with said gyroscope, a generator for driving said motor, a dynamo-electric machine connected to said generator, means whereby said machine may be supplied with current from an exterior source to drive said generator prior to launching, and means for driving said generator by a prime mover after launching.

5. The combination with an automobile torpedo, of a gyroscope, an electric motor associated with said gyroscope, electrical means for controlling the torpedo from the gyroscope, a generator for driving said motor, a dynamo-electric machine connected to said generator, means whereby said machine may be supplied with current from an exterior source to drive said generator prior to launching, means for driving both of said machines by a prime mover after launching and means for exciting said electrical controlling means from said dynamo-electric machine.

6. The combination with an automobile torpedo, of a gyroscope, a motor for driving the gyroscope, electrical means for controlling the steering of the torpedo from the gyroscope, and a dynamo-electric machine driven from the torpedo driving engine for actuating both said motor and said means.

7. The combination with an automobile torpedo, of a plurality of gyroscopes, an induction motor associated with each gyroscope, and a single A. C. generator driven by a prime mover within the torpedo for driving all the motors, whereby all the gyroscopes are maintained at the same speed.

8. In an automobile torpedo, a gyroscopic steering mechanism including a pair of oppositely rotating gyroscopes coupled for opposite precession.

9. The combination with an automobile torpedo, of a gyroscope, an electric motor associated with the gyroscope, a dynamo driven by a prime mover within the torpedo for driving said motor to a predetermined speed, and means whereby said motor may be driven from an external source of supply to a speed somewhat less than said predetermined speed.

10. A torpedo, a source of power supply for propelling the torpedo, gyro steering equipment for the torpedo, a spinning means for said equipment for initially spinning the gyros to a predetermined speed, and a second spinning means for materially accelerating and maintaining said spin after the launching of the torpedo, both of said means being arranged to derive its energy from said main power source.

11. The combination with an automobile torpedo, of a gyroscope, an electric motor associated with the gyroscope, a dynamo driven from a prime mover within the torpedo, and means whereby said motor may be driven from an external source of supply for starting the gyroscope.

12. In an automobile torpedo, of a plurality of gyroscopes, interconnected about their precession axes, an electric motor associated with each gyroscope, means for initially spinning the gyros in opposite directions and a generator within the torpedo for driving said motors and maintaining said spin.

13. The combination with an automobile torpedo, of a gyroscope, a motor for driving the gyroscope, electrical means for controlling the position of the gyroscope and a dynamo-electric machine for actuating both said motor and said means.

14. The combination with an automobile torpedo, of a pair of interconnected gyroscopes, a motor for each gyroscope, electrical means for centralizing the gyroscopes, and a dynamo-electric machine within the torpedo for actuating both of said motors and said means.

15. The combination with an automobile torpedo, of a pair of interconnected gyroscopes, a motor for each gyroscope, electrical means for controlling the steering of the torpedo from the gyroscopes, electrical means for centralizing the gyroscopes, and a dynamo-electric machine within the torpedo for actuating both of said motors and said means.

16. A torpedo, a source of power supply for propelling the torpedo, an electrically spun gyro steering equipment for the torpedo, a spinning means for said equipment for initially spinning the gyro to a predetermined speed and a second spinning means including an electric motor for materially accelerating and maintaining said spin after the launching of the torpedo, both of said means being arranged to derive its energy from said main power source.

17. In a torpedo, the combination with a gyroscopic steering gear of an electric motor for driving the gyroscope, a source of electrical supply within the torpedo, means for establishing an electric circuit to the torpedo from an external supply source for spinning the gyroscope, and means for breaking such circuit and establishing a circuit between said interior source of supply and said motor.

18. The combination with an automobile torpedo, of a gyroscope, an A. C. motor associated with the gyroscope, an A. C. generator driven from the main power source in the torpedo for actuating said motor, and a D. C. generator driven by said main power source adapted to excite the field of said A. C. generator.

19. The combination with an automobile torpedo of a gyroscope, an A. C. motor associated with the gyroscope an A. C. generator driven from the main power source of the torpedo for actuating the said motor and a D. C. generator driven by said main power source, a mechanical connection between said generators, and means whereby said D. C. generator may be driven as a motor prior to the starting of said power source whereby said A. C. generator is caused to actuate said motor.

20. The combination with a torpedo of a gyroscope, an A. C. motor associated with the gyroscope, an A. C. generator driven from the main source of the torpedo for actuating said motor and a D. C. generator driven by said main power source adapted to excite the field of said A. C. generator, a mechanical connection between said generators and means whereby said D. C. generator may be driven as a motor prior to the starting of said power source.

21. The combination with a torpedo of a gyroscope, an A. C. motor associated with the gyroscope, electrical means for controlling the torpedo from said gyroscope, an A. C. generator for actuating said motor, a D. C. generator for actuating said means, both of said generators being driven from the torpedo power source, and means for driving said A. C. generator by employing the D. C. generator as a motor prior to the launching.

22. The combination with a torpedo, of an electric motor gyroscope therein, a dynamo therein adapted to be driven from the main power source within the torpedo for driving said gyroscope, and means for conveying energy from without the torpedo to said dynamo for spinning said gyroscope prior to launching.

23. The combination with a torpedo, of an electric motor gyroscope therein, a dynamo therein adapted to be driven from the main power source within the torpedo for driving said gyroscope, a motor connected with said dynamo, and means for conveying energy from without the torpedo to said motor for spinning the said dynamo and said gyroscope prior to launching.

24. The combination of a gyroscopically controlled torpedo, of an electric motor gyroscope, an external source of electrical energy for spinning said gyroscope, a source of energy carried by the torpedo for maintaining the spinning of said gyroscope, and means for conveying electrical energy to the gyroscope from the last named source when the energy from the external source is discontinued.

25. The combination of a gyroscopically controlled torpedo, an electric motor gyroscope therein contained, an external source of electrical energy for spinning said gyroscope, an internal source of energy for maintaining the spinning of said gyroscope, and means for automatically conveying electrical energy to the gyroscope from the internal source when the energy from the external source is discontinued.

26. The combination of a gyroscopically controlled torpedo, an electric motor gyroscope mounted therein, an external source of electrical energy for spinning said gyroscope, a source of energy carried by the torpedo for maintaining the spinning of said gyroscope, and means for automatically conveying electrical energy to the gyroscope from the last named source when the torpedo is launched.

27. The combination with an automobile torpedo, of a gyroscope, an electric motor associated with the gyroscope, a dynamo driven from the torpedo driving engine, and means whereby said motor may be driven by the said dynamo prior to launching.

28. The combination with an automobile torpedo, of a gyroscope, an electric motor associated with the gyroscope, a dynamo driven from the torpedo driving engine, and means independent of the torpedo driving engine for operating said dynamo to start said gyroscope prior to launching.

29. In a torpedo, an electric motor gyroscope, a dynamo for operating said motor, means for operating the dynamo prior to launching, and means for maintaining its operation subsequently.

30. The combination with an automobile torpedo, of a gyroscope, an electric motor associated with the gyroscope, a dynamo driven from the torpedo driving engine, and external means for driving said dynamo prior to launching.

31. The combination with an automobile torpedo, of a gyroscope, an electric motor associated with the gyroscope, a dynamo adapted to be driven from the torpedo driving engine, and means whereby said motor may be driven from said dynamo prior to launching.

32. The combination with an automobile torpedo, of a gyroscope, an electric motor associated with said gyroscope, a generator for driving said motor, a motor connected to said generator, means whereby said motor may be supplied with current from an exterior source to drive said generator prior to launching, and means for driving said generator by a prime mover after launching.

33. The combination with a torpedo and torpedo launching tube, of steering mechanism within the torpedo, an electric-motor gyroscope for controlling said mechanism, a dynamo-electric machine within the torpedo for driving said gyroscope, means for establishing an electric circuit to said machine through the walls of the torpedo, and means for breaking said circuit.

34. The combination with an automobile torpedo, of electrically actuated mechanism therein contained, a dynamo-electric machine for supplying said mechanism with current, and means for driving said machine from a source without the torpedo prior to launching.

35. The combination with an automobile torpedo, of electrically actuated mechanism therein contained, a dynamo-electric machine for supplying said mechanism with current, means whereby said machine may be driven from a source of power within the torpedo, and means for driving said machine from a source without the torpedo prior to launching.

36. The combination with an automobile torpedo, of electrically actuated mechanism therein contained, a generator for supplying said mechanism with current, a motor connected to said generator, means whereby said motor may be supplied with current from an exterior source to drive said generator prior to launching, and means for driving said generator by a prime mover after launching.

37. The combination with an automobile torpedo, of an electrically spun gyroscope therein contained, means for spinning said gyroscope comprising a dynamo-electric machine within the torpedo, and means for driving said machine prior to launching.

38. The combination with an automobile torpedo, of an electrically spun gyroscope therein contained, means for spinning said gyroscope comprising a dynamo-electric machine within the torpedo, and means for driving said machine from a source of power without the torpedo prior to launching.

39. The combination with an automobile torpedo, of an electrically spun gyroscope therein contained, means for spinning said gyroscope comprising a coupled generator and motor within the torpedo and means whereby said motor may be supplied with current to drive said generator prior to launching.

40. The combination with an automobile torpedo, of electrically actuated mechanism therein contained, a dynamo-electric machine for supplying said mechanism with current, a one way driving connection between the torpedo engine and said machine, and means for driving said machine from a source without the torpedo.

41. The combination with an automobile torpedo, of electrically actuated mechanism therein contained, a generator for supplying said mechanism with current, a motor connected to said generator, means whereby said motor may be supplied with current from an exterior source to drive said generator prior to launching, and a one way driving connection between the torpedo engine and said generator for driving it after launching.

42. In an automobile torpedo, the combination with a gyroscopic steering gear for the torpedo, of an electric motor for driving the gyroscope, means whereby an electric current may be carried within the torpedo from an external supply source for spinning the gyroscope, means for breaking such circuit, and means on the torpedo for supplying said motor with energy after launching.

43. In a torpedo, an electric motor gyroscope, a propeller shaft, an engine for driving the same, a source of power for the engine, a dynamo adapted to be driven by the said shaft and means independent of said source of power for driving the propeller shaft.

44. In a torpedo, an electric motor gyroscope, a dynamo for driving said motor, a member operable from an internal source of supply for driving said dynamo, and external means for operating said member prior to launching.

45. In a torpedo, propelling means, an electric motor gyroscope, means for initially operating the gyroscope comprising a dynamo driven by said propelling means, and means for starting the propelling means.

46. In a torpedo, propelling means, a dynamo driven by propelling means, and an electric motor gyroscope adapted to be spun initially upon the starting of the propelling means.

In testimony whereof, I have signed my name to this specification this 24th day of August, 1915.

ELMER A. SPERRY.